United States Patent
Ariyoshi et al.

(10) Patent No.: US 7,616,549 B2
(45) Date of Patent: Nov. 10, 2009

(54) CHROMATIC ABERRATION-CORRECTING ELEMENT AND OPTICAL PICKUP DEVICE USING THE SAME

(75) Inventors: Tetsuo Ariyoshi, Osaka (JP); Ho Seop Jeong, Seongnam-si (KR); Soo Jin Jung, Suwon-si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 777 days.

(21) Appl. No.: 11/267,396

(22) Filed: Nov. 4, 2005

(65) Prior Publication Data
US 2006/0104184 A1 May 18, 2006

(30) Foreign Application Priority Data
Nov. 5, 2004 (KR) .................. 10-2004-0089832

(51) Int. Cl.
*G11B 7/00* (2006.01)
(52) U.S. Cl. .................. 369/112.07; 369/112.12; 369/53.2; 359/719; 359/742
(58) Field of Classification Search ............ 369/112.01, 369/112.03; 359/742, 719
See application file for complete search history.

(56) References Cited

U.S. PATENT DOCUMENTS

| | | | | |
|---|---|---|---|---|
| 5,784,347 A * | 7/1998 | Miyamoto et al. | ....... | 369/53.33 |
| 6,552,990 B1 * | 4/2003 | Kajiyama et al. | ...... | 369/112.06 |
| 7,227,704 B2 * | 6/2007 | Koike | .......... | 359/719 |
| 2001/0019528 A1 * | 9/2001 | Shiono et al. | .......... | 369/112.08 |
| 2004/0233821 A1 * | 11/2004 | Saitoh et al. | ........... | 369/112.05 |
| 2004/0264343 A1 * | 12/2004 | Hendriks et al. | ........ | 369/112.01 |
| 2005/0105447 A1 * | 5/2005 | Ikenaka et al. | ......... | 369/112.06 |
| 2005/0207315 A1 * | 9/2005 | Nomura et al. | ........ | 369/112.13 |
| 2005/0249064 A1 * | 11/2005 | Kimura et al. | ........... | 369/44.37 |
| 2006/0077568 A1 * | 4/2006 | Okamura et al. | ............ | 359/742 |

FOREIGN PATENT DOCUMENTS

JP    2001-256672 A    9/2001

* cited by examiner

*Primary Examiner*—Wayne R Young
*Assistant Examiner*—Linh T Nguyen
(74) *Attorney, Agent, or Firm*—Darby & Darby P.C.

(57) ABSTRACT

The present invention is related to a chromatic aberration-correcting element which allows the adoption of BDs even when DVD/CD light beams are incident. The chromatic aberration-correcting element has a diffractive structure formed thereon, which can correct chromatic aberration in BD wavelength light beams in addition to adopting DVD/CD wavelength light beams. Also provided is an optical pickup device whose structure is simplified by employing the chromatic aberration-correcting element.

13 Claims, 15 Drawing Sheets wavefront aberration of DVD 0.020λrms waterfront aberration of DVD 0.026λrms waterfront aberration of DVD 0.011λrms waterfront aberration of DVD 0.020λrms

CHROMATIC ABERRATION-CORRECTING ELEMENT AND OPTICAL PICKUP DEVICE USING THE SAME

INCORPORATION BY REFERENCE

The present application claims priority under 35 U.S.C. §119 to Korean Patent Application No. 10-2004-0089832 filed on Nov. 5, 2004. The content of the application is incorporated herein by reference in its entirety.

BACKGROUND OF THE INVENTION

1. Field of the Invention

The present invention relates to the accommodation of various optical recording media of different thicknesses by an optical pickup device. More particularly, the present invention relates to a chromatic aberration-correcting element which allows an optical pickup device to universally adopt optical discs different in thickness and in recording/reproducing laser wavelength in the presence of only a single objective lens optimally adapted for blue lasers, and an optical pickup device provided with the same.

2. Description of the Related Art

As means for storing image and/or voice information or as secondary memory units for computers, optical recording media (hereinafter referred to as just "optical media"), which are now predominant over other recording media, are largely classified into compact discs (CD) with a storage capacity of 650 MB and digital versatile discs (DVD) with a storage capacity of 4.7 GB. Determining the amount of information able to be recorded or regenerated, the recording density of optical media depends on the optical spot on which a laser can be focused through an objective lens. A focused laser beam has a focal spot diameter scaling S according to the following Equation 1:

$$S \propto \lambda/NA \quad \text{Equation 1}$$

where $\lambda$ is the wavelength of the laser beam and NA is the objective lens numerical aperture.

Hence, an increase in recording density is mainly enabled by reducing the spot size by using shorter wavelength light and by increasing the numerical aperture of the objective lens. Nowadays, a blue-violet laser beam is used as a short wavelength light source with an NA over 0.6. For example, as much as 22 GB can be stored by using a blue wavelength (405 nm) in combination with an NA=0.85 objective lens.

However, the high numerical aperture places a stringent constraint on disc tilt because tilt causes coma aberration, which is represented by the following equation.

$$W_{31} = -\frac{d}{2}\frac{n^2(n^2-1)\sin\theta\cos\theta}{(n^2-\sin^2\theta)^{5/2}}NA^3 \quad \text{Equation 2}$$

where $W_{31}$ is a coma aberration, $\theta$ is a tilt angle of an optical disc, n is a refractive index of the optical disc, d is a thickness of the optical disc, and NA represents a numerical aperture of the optical disc.

Usually, the thickness of an optical disc refers to that from a light incident layer to a recording layer in the optical disc. The refractive index also refers to that measured in the above thickness range. In general, because signal degradation due to disc tilt is in inverse proportion to the wavelength of the incident laser beam and in direct proportion to the cube of NA of the objective lens, the tolerance for disc tilt sharply decreases with an increase in storage density. In order to compensate for this, an optical disc with a high recording density is reduced in thickness. This is corroborated through Equation 2 in that, to attain tolerance for disc tilt, disc thickness must be reduced as the numerical aperture of the objective lens is increased for high storage density. For instance, CDs which use a 780 nm beam are 1.2 mm thick, and DVDs are reduced to a thickness of 0.6 mm due to the use of a 650 nm beam. Thus, an optical disc using a blue laser, hereinafter referred to as a 'blue-ray disc' (BD), is anticipated to be 0.1 mm thick. Of course, the numerical aperture of the objective lens is 0.45 for CDs and 0.6 for DVDs. In the case of BDs, the numerical aperture may be as high as 0.85. As such, an important problem anticipated to stem from the development of new standards of optical discs is found in the compatibility between the new standards and pre-existing ones.

The use of blue wavelength laser beams for recording data at high density requires a high numerical aperture, but causes a problem in that high numerical apertures amplify the influence of aberrations. Particularly the influence of wavelength fluctuation of a semiconductor laser is aggravated. The wavelength fluctuation of a semiconductor laser occurs in response to a change in the temperature of the operational environment or in the beam energy of the semiconductor laser. For instance, when the environment for the emission of a beam from a semiconductor laser changes by one degree Celsius from 25° C., the wavelength fluctuates within a range of ±0.07 nm. A change of 1 mW in the emission energy of a semiconductor laser results in a wavelength fluctuation within a range of ±0.04 nm. In an optical pickup device capable of recording and reproducing data, a semiconductor laser operates with a pulse output of 30 to 50 mW upon recording, which leads to a momentary wavelength fluctuation in the range of 1.2 to 2 nm. A momentary wavelength fluctuation of as large as 2 nm causes a focal point to deviate a distance of as long as 0.35 um when an objective lens with a numerical aperture of 0.85 is used. The positional deviation of the focus causes a change in the total focal length of the objective lens because the refractive index of the material of the objective lens changes with the wavelength. The depth of focus of an objective lens is represented by $\lambda/(NA)^2$. When the positional deviation of the focus is as large as or larger than $\pm\lambda/(2NA^2)$, optical spots small enough to reproduce data cannot be formed. Where $\lambda$=410 nm and NA=0.85, if the positional deviation of focus is as large as $\lambda/(2NA^2)$=0.28 um, it is almost impossible to record or reproduce data.

Thus, in order to remove chromatic aberrations caused by the use of a short wavelength such as a blue laser, an optical element for correcting chromatic aberrations is positioned in the optical path of the laser. Japanese Pat. Laid-Open Publication No. 2001-256672 discloses a chromatic aberration-correcting element which is provided in the path through which a laser beam propagates. The chromatic aberration-correcting element, consisting of a diffraction optical element and a concave lens, is provided between an objective lens and a semiconductor laser so as to correct chromatic aberration in a short wavelength such as a blue laser.

However, the chromatic aberration-correcting element is not an element that allows DVDs and CDs to be compatibly adopted. Because, after being incident on the chromatic aberration-correcting element, DVD/CD laser beams diverge or converge, the position where the chromatic aberration-correcting element can be inserted remains limited. For this reason, an optical pickup device provided with the chromatic aberration-correcting element cannot integrate a BD optical system and a DVD/CD optical system therein, but has a complicated structure.

Therefore, there is a need for a chromatic aberration-correcting element that compatibly use light sources of different wavelengths so as to integrate a BD optical system and a DVD/CD optical system therein.

SUMMARY OF THE INVENTION

Accordingly, the present invention has been made keeping in mind the above problems occurring in the prior art, and an object of the present invention is to provide a chromatic aberration-correcting element which can universally use BD, DVD and CD light beams, and an optical pickup device provided with the chromatic aberration-correcting element.

Another object of the present invention is to provide a chromatic aberration-correcting element which allows the correction of chromatic aberrations and the compatible adoption of BDs, and DVDs/CDs at the same time therein.

A further object of the present invention is to provide an optical pickup device which can position BD light and DVD/CD light in the same path by use of the chromatic aberration-correcting element so that it can be simple in structure.

In accordance with an aspect of the present invention, there is provided a chromatic aberration-correcting element for correcting chromatic aberration in light beams for high-density recording media, characterized in that the chromatic aberration-correcting element enables light beams for high-density recording media to share an optical path with those for low-density recording media without negative effects on the compatible adoption of high- and low-density recording media and has such a stepped structure formed in a concentric pattern as to universally use the light beams for high- and low-density recording media.

The chromatic aberration-correcting element comprises a diffractive structure formed on one or each side, which enables wavelengths of light beams for a first low-density recording medium ($\lambda_1$) and a second low-density recording medium ($\lambda_2$) to be used together, the first low-density recording medium being of higher density relative to the second low-density recording medium.

In accordance with another aspect of the present invention, there is provided an optical pickup device comprising the chromatic aberration-correcting element; and a common photodetector for detecting light beams reflected from the high-density recording medium and from the low-density recording medium, said light beams reflected from the high-density recording medium taking the path of incident light beams due to the operation of the chromatic aberration-correcting element.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
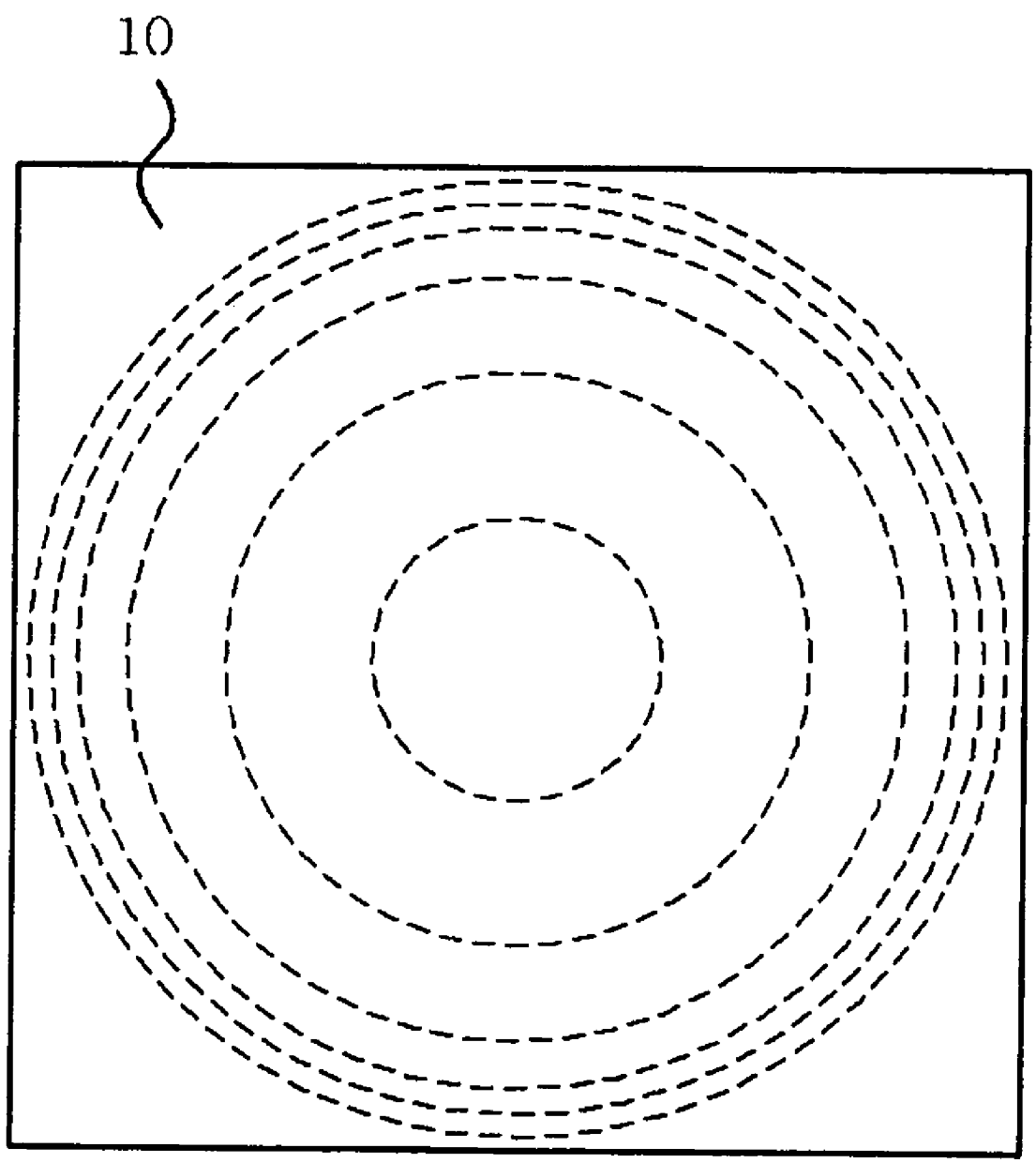
FIG. 1 is a plan view of a chromatic aberration-correcting element according to the present invention.

Reference now should be made to the drawings, in which the same reference numerals are used throughout the different drawings to designate the same or similar components.

Figure 2:
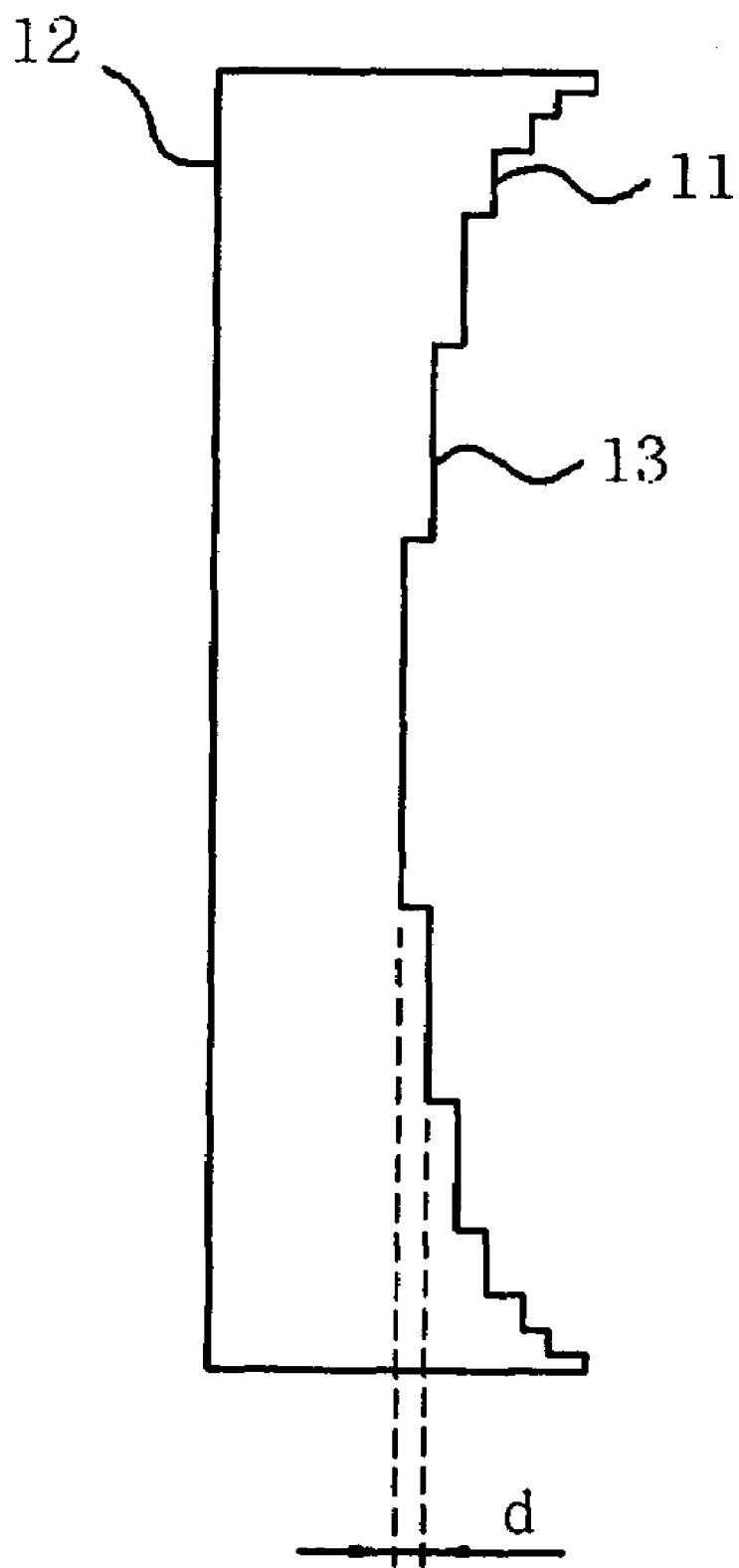
FIG. 2 is a side view of a chromatic aberration-correcting element according to the present invention.

With reference to FIGS. 1 and 2, a chromatic aberration-correcting element 10 according to the present invention is shown in a plan view and a side view, respectively. As seen in the figures, the chromatic aberration-correcting element 10 of the present invention has a stepped structure 11 formed in a concentric pattern on one side. In the present invention, the correction of chromatic aberrations can be accomplished by optimally setting the distance d between the steps (hereinafter referred to as 'step depth') and designing an optimal concentric pattern. In addition, the chromatic aberration-correcting element 10 enables an optical pickup device to universally adopt a high-density optical recording medium and a low-density optical recording medium.

In an embodiment of the present invention, the low-density optical recording medium is described separately as a first and a second low-density optical recording medium: the first is of high density relative to the second. In this embodiment, the high-density recording medium is exemplified by a BD for which a laser beam with a wavelength as short as 405 nm is used in combination with a numerical aperture of 0.85. The first low-density recording medium is a DVD which employs a 650 nm laser beam in combination with a numerical aperture of 0.6 whereas the second low-density recording medium is a CD, employing a 780 nm laser beam in combination with a numerical aperture of 0.4.

The chromatic aberration-correcting element 10 is made from a transparent plastic substrate in which a stepped structure is formed in a concentric pattern, as illustrated in FIGS. 1 and 2. Instead of plastic materials, transparent glass substrates may be used for the chromatic aberration-correcting element.

The step depth d of the stepped structure is designed to meet the following relation formula:

$$d = m_o \lambda_o / (n_o - 1) \quad \text{Equation 3}$$

where $m_o$ is an integer, $\lambda_o$ is the wavelength of a BD light beam traveling the central axis of an objective lens, and $n_0$ is the refractive index of the plastic material.

When parallel light beams with a wavelength of $\lambda_o$ are incident on the chromatic aberration-correcting element 10 satisfying the conditions of Equation 3, phase differences between the steps are integer times larger than $\lambda_o$, thus with no effects on the transmitted light. When a light beam having a wavelength of ($\lambda_o + \Delta\lambda$) is incident on the chromatic aberration-correcting element 10 having the stepped structure, the phase difference generated between two adjacent steps is represented by $d(n_0 - 1)/(\lambda_o + \Delta\lambda)$.

Herein, $$d(n_0-1)/(\lambda_o+\Delta\lambda) \approx \{d(n_o-1)/\lambda_o\}(1-\Delta\lambda/\lambda_o) = m_o(1-\Delta\lambda/\lambda_o)$$

where $\lambda_o \gg \Delta\lambda$. Therefore, the phase difference is substantially $-m_o(\Delta\lambda/\lambda_o)$. The concentric pattern is optimally designed for the substantial phase difference $-m_o(\Delta\lambda/\lambda_o)$ to correct the chromatic aberration generated in the objective lens by the wavelength change $\Delta\lambda$.

When a DVD wavelength $\lambda_1$ and a CD wavelength $\lambda_2$ are incident on the chromatic aberration-correcting element 10 according to an embodiment of the present invention, if the plastic material shows a refractive index of $n_1$ for $\lambda_1$ and $n_2$ for $\lambda_2$, the phase differences for the DVD wavelength and the CD wavelength are respectively represented by $d(n_1-1)/\lambda_1 = m_1+\alpha$ and $d(n_2-1)/\lambda_2 = m_2+\beta$ wherein $m_1$ and $m_2$ are integers, $-0.5<\alpha<0.5$, and $-0.5<\beta<0.5$. In one embodiment of the present invention, the chromatic aberration of the objective lens can be corrected for BDs by selecting such an $m_o$ (step depth d) that the substantial phase differences $\alpha$ and $\beta$ become as small as possible. Further, there are no negative effects on the ability of the chromatic aberration-correcting element 10 thus obtained to be compatibly applied to DVD/CDs.

Figure 3:
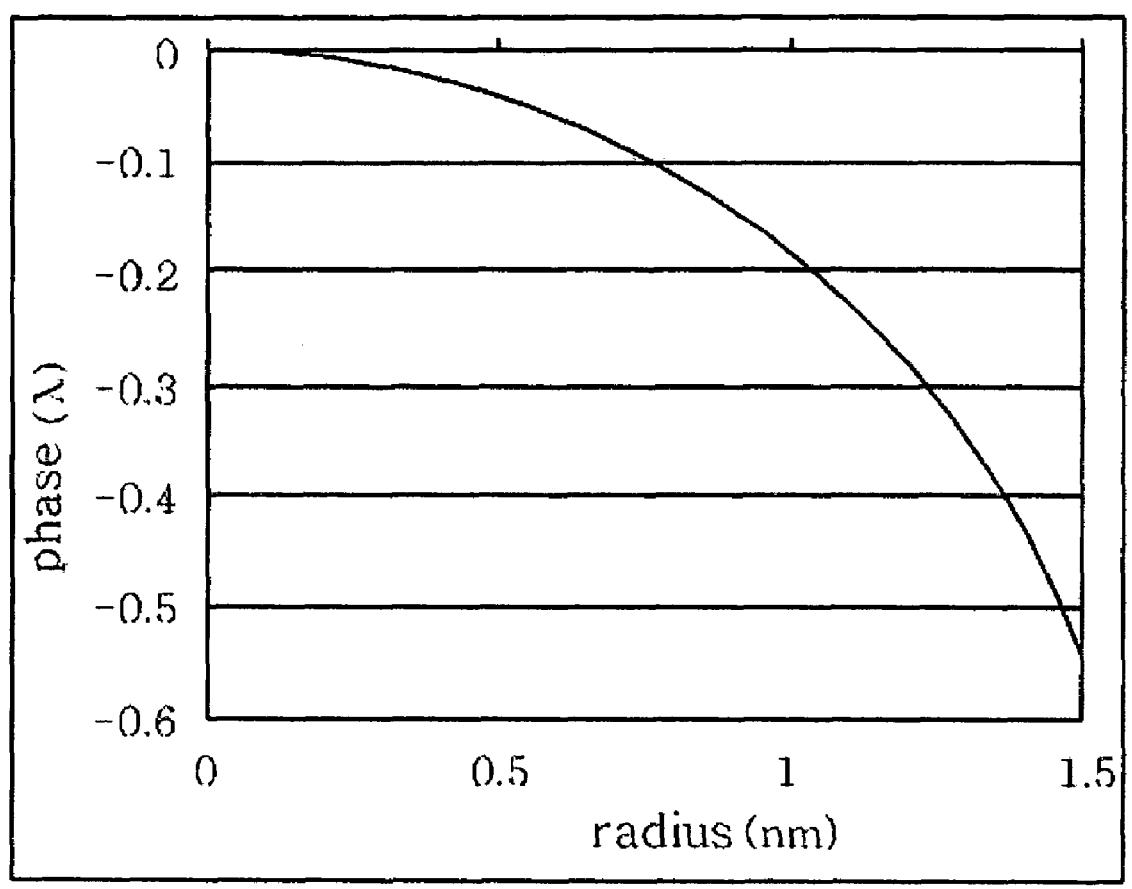
FIG. 3 shows a waterfront aberration of a BD-exclusive objective lens at 406 nm.

FIG. 3 shows a waterfront aberration of a BD-exclusive objective lens designed for a central wavelength of 405 nm, at 406 nm. The waterfront aberration is mainly composed of a defocal component which is in proportion to the square of the radius r and the total waterfront aberration is about 0.145 $\lambda$rms. Herein, the defocal component can be corrected by the auto-focusing of the pickup device. However, because an actuator cannot follow an abrupt wavelength fluctuation which occurs when the operation of the pickup device switches from reproducing to recording, the defocal component also needs correction.

Figure 4:
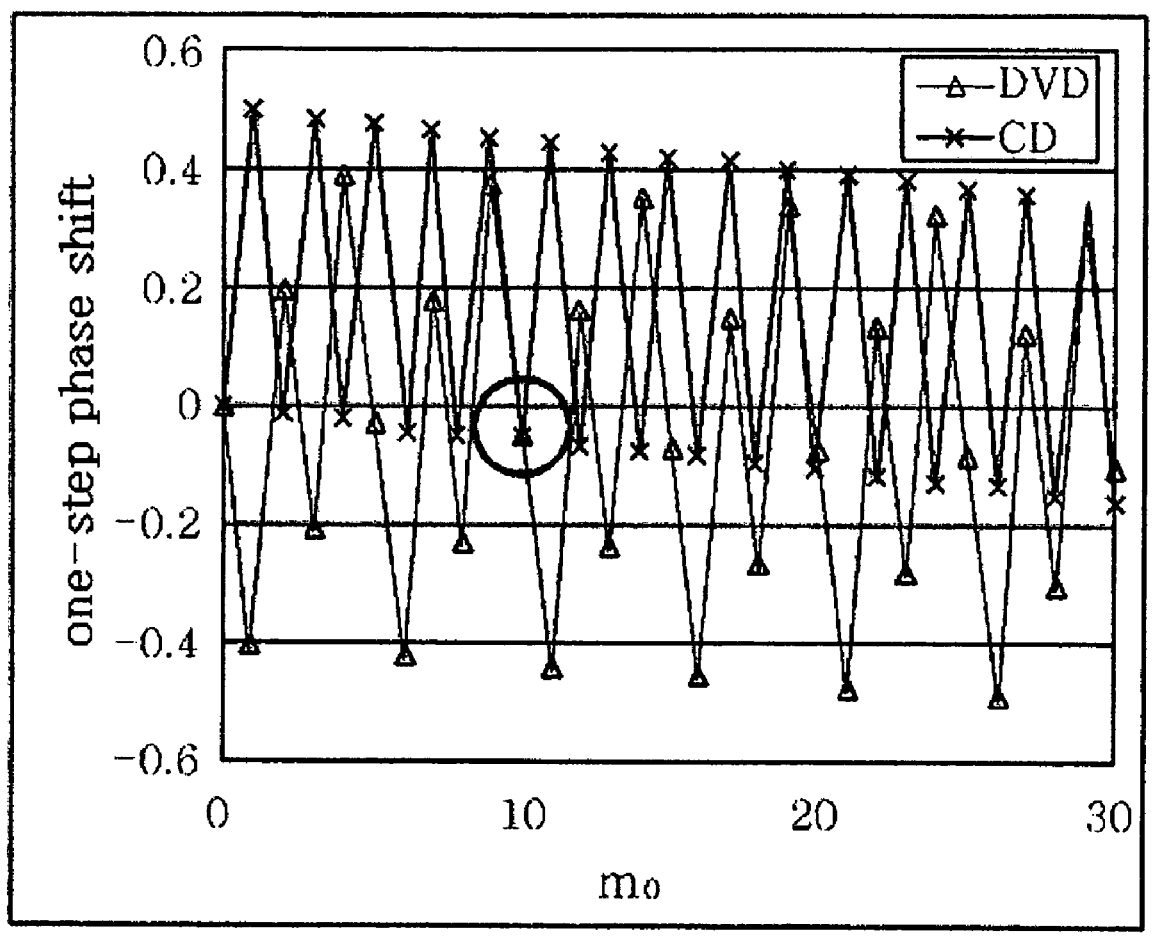
FIG. 4 shows step phase shifts in DVD/CD wavelengths.

For the reason stated above, the chromatic aberration-correcting element is made from the transparent optical plastic material ZEONEX 330R in accordance with one embodiment of the present invention. This material has refractive indices of $n_o=1.525$ at $\lambda=405$ nm, $n_1=1.507$ at $\lambda_1=655$ nm, and $n_2=1.503$ at $\lambda_2=785$ nm. When the step depth satisfies Equation 3, that is, $d = m_o \times \lambda_o/(n_o-1)$, the phase shifts $\alpha$ and $\beta$ generated, respectively, for $\lambda_1$ and $\lambda_2$ are plotted versus $m_o$ in FIG. 4. At $m_o=10$, as apparent in the plot, the phase shifts $\alpha$ and $\beta$ become small together. That is, $d=7.7$ um at $m_o=10$.

Herein, when $m_o=10$, the phase shift generated for $\Delta\lambda=1$ nm is $-0.025(\lambda_o)$. From the finding that the phase shift between two steps different by one order is $-0.025(\lambda_o)$ at $\Delta\lambda=1$ nm, the pattern of the concentric circles shown in FIG. 1 can be optimized for the correction of waterfront aberrations. Where $m_o=10$, the pattern is so structured that the steps increases by one order with regard to the radius r whenever the waterfront aberration increases by $0.025(\lambda_o)$. Detailed thicknesses of the element are given in relation to the radius limit in Table 1, below.

TABLE 1

| Radius start (mm) | Radius terminus (mm) | Thickness (μm) |
| --- | --- | --- |
| 0 | 0.390 | 0 |
| 0.390 | 0.549 | 7.7 |
| 0.549 | 0.668 | 15.4 |
| 0.668 | 0.766 | 23.1 |
| 0.766 | 0.849 | 30.8 |
| 0.849 | 0.922 | 38.5 |
| 0.922 | 0.987 | 46.2 |
| 0.987 | 1.045 | 53.9 |
| 1.045 | 1.097 | 61.6 |
| 1.097 | 1.145 | 69.3 |
| 1.145 | 1.189 | 77 |

TABLE 1-continued

| Radius start (mm) | Radius terminus (mm) | Thickness (μm) |
| --- | --- | --- |
| 1.189 | 1.230 | 84.7 |
| 1.230 | 1.268 | 92.4 |
| 1.268 | 1.303 | 100.1 |
| 1.303 | 1.336 | 107.8 |
| 1.336 | 1.367 | 115.5 |
| 1.367 | 1.396 | 123.2 |
| 1.396 | 1.423 | 130.9 |
| 1.423 | 1.449 | 138.6 |
| 1.449 | 1.474 | 146.3 |
| 1.474 | 1.500 | 154 |

Figure 5A:
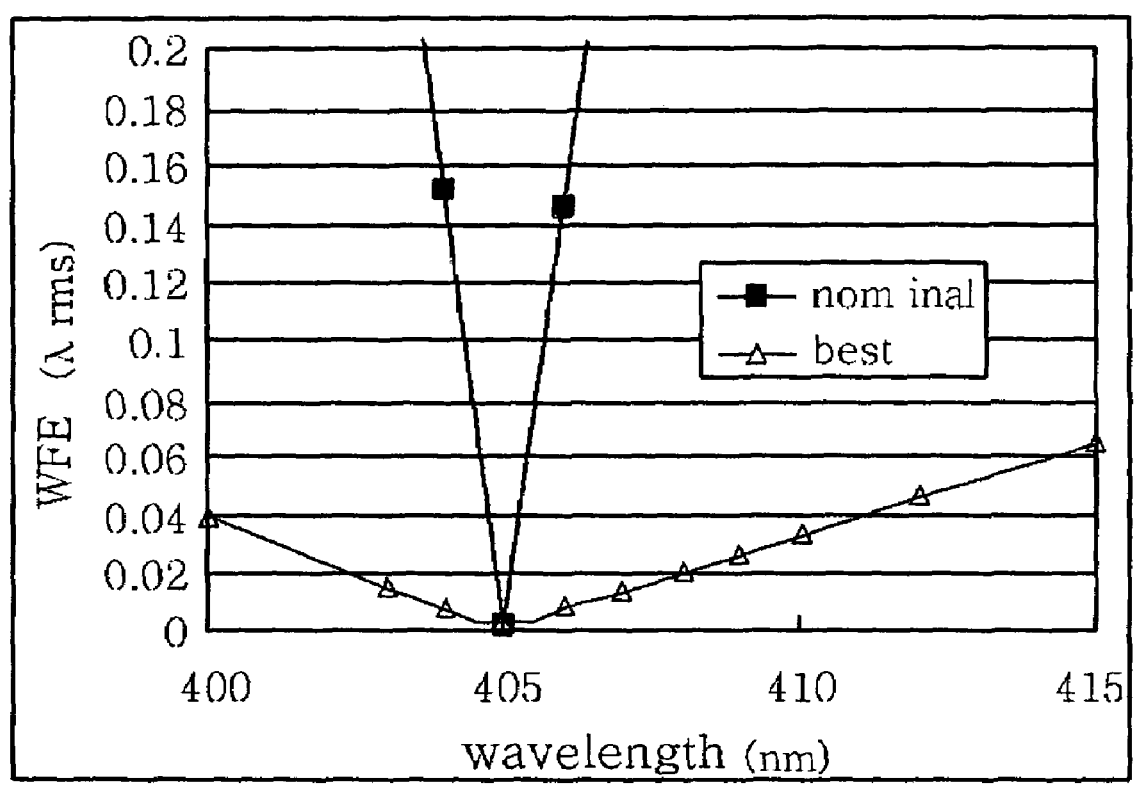
FIGS. 5A and 5B show correction results obtained by use of the chromatic aberration-correcting element of the present invention.
Figure 5B:
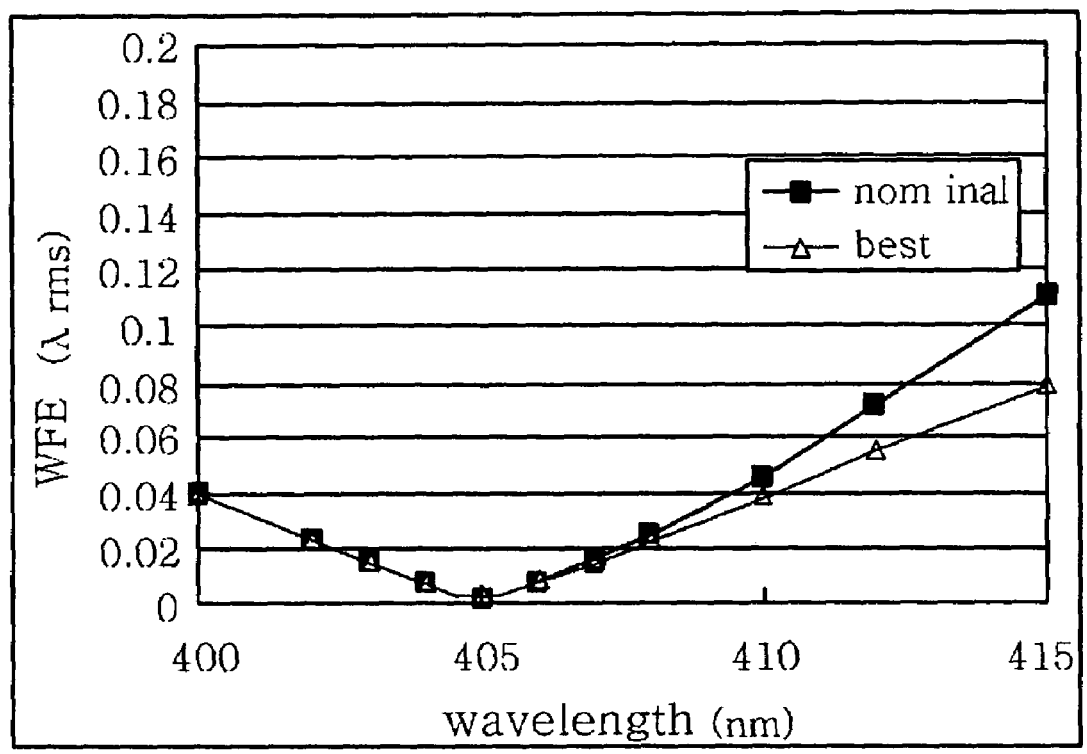

Effects of the correction achieved by the chromatic aberration-correcting element, shown in Table 1, are illustrated in FIG. 5. FIG. 5A shows waterfronts aberrations generated in the absence of the chromatic aberration-correcting element of the present invention while FIG. 5B shows a corrected result in the presence of the chromatic aberration-correcting element of the present invention. When the chromatic aberration-correcting element 10 is not employed, much larger waterfront aberrations are generated compared to those of wavelengths at best pinpoints, as shown in FIG. 5A. By contrast, in the presence of the chromatic aberration-correcting element, waterfront aberrations similar to those found at best pinpoints are generated, as shown in FIG. 5B.

Conventionally, when being incident on a chromatic aberration-correcting element, DVD/CD light diverges or converges, thereby increasing total waterfront aberration. However, the total waterfront aberration can be prevented from increasing in the present invention by use of the chromatic aberration-correcting element 10 in which a step structure with adjusted step sizes is formed in a concentric pattern. The operational effect of the chromatic aberration-correcting element 10 is seen in FIGS. 6 and 7.

In advance of the operational effect, the compatible use of DVDs/CDs in a BD-exclusive objective lens is described. It can be achieved by allowing diverging beams to be incident on the BD-exclusive objective lens. In one embodiment of the present invention, beams with a wavelength $\lambda_1$ of 655 nm are used for 0.6 mm thick DVDs and beams with a wavelength $\lambda_2$ of 785 nm for 1.2 mm thick CDs. The diverging beams are optimized to correct aberrations due to differences in wavelength and disc thickness, but the compatible adoption of CDs/DVDs may be degraded when the diverging beams pass through the chromatic aberration-correcting element 10. In an embodiment of the present invention, the diverging beams are incident on the chromatic aberration-correcting element in the range of r<1.18 for DVDs and in the range of r<0.89 for CDs under the condition that the numerical aperture is 0.65 for DVDs and 0.45 for CDs.

Figure 6A:
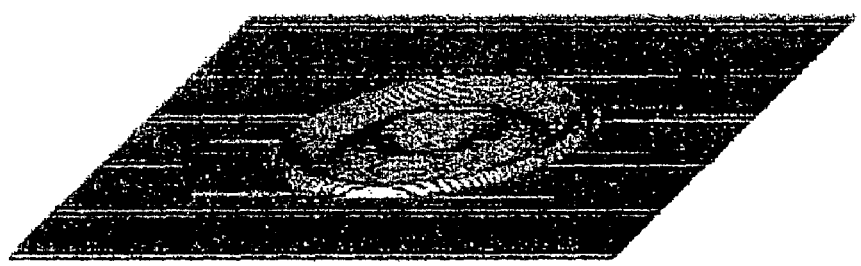
FIGS. 6A, 6B, 7A, and 7B show the effects of the chromatic aberration-correcting element of the present invention on the compatible adoption of CDs and DVDs.
Figure 6B:
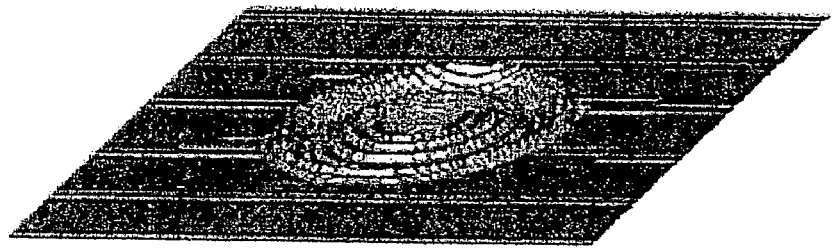

FIGS. 6A and 6B show waterfront aberrations on a DVD in the absence and presence of the chromatic aberration-correcting element, respectively. When the chromatic aberration-correcting element is not used, the chromatic aberration on a DVD is about 0.020 $\lambda$rms. By contrast, the presence of the chromatic aberration-correcting element was found to increase the chromatic aberration to about 0.026 $\lambda$rms.

Figure 7A:
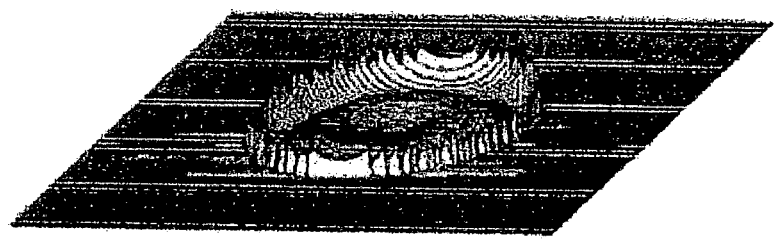
Figure 7B:

This increase is also true of CDs as seen in FIGS. 7A and 7B. FIG. 7A shows a waterfront aberration of 0.011 $\lambda$rms on a CD in the absence of the chromatic aberration-correcting element 10. The waterfront aberration is increased to 0.020 $\lambda$rms in the presence of the chromatic aberration-correcting element, as in a DVD. However, the total wavefront aberrations, although increasing, still meet not only the Marechal's condition (waterfront aberration<0.07 $\lambda$rms) but also the recording system condition (waterfront aberration<0.033 λrms), thereby bringing about problems in the reproduction of data. This can be achieved by selecting such a step depth that the phase difference generated on DVDs and CDs is as small as possible. Therefore, the use of the chromatic aberration-correcting element of the present invention allows the chromatic aberration of BDs to be corrected without negative effects on the compatible adoption of DVDs and CDs.

Waterfront aberrations of the above-stated embodiments are obtained at $m_o=10$. In another embodiment, the waterfront aberration on a DVD was calculated to be 0.029 λrms at $m_o=20$. This value is obtained when α=0.1. If α is over 0.1, the waterfront aberration on a DVD exceeds 0.033 λrms which is the condition for the recording system. Thus, it is preferred that the absolute values of α and β be selected to be 0.1 or less.

Figure 8:
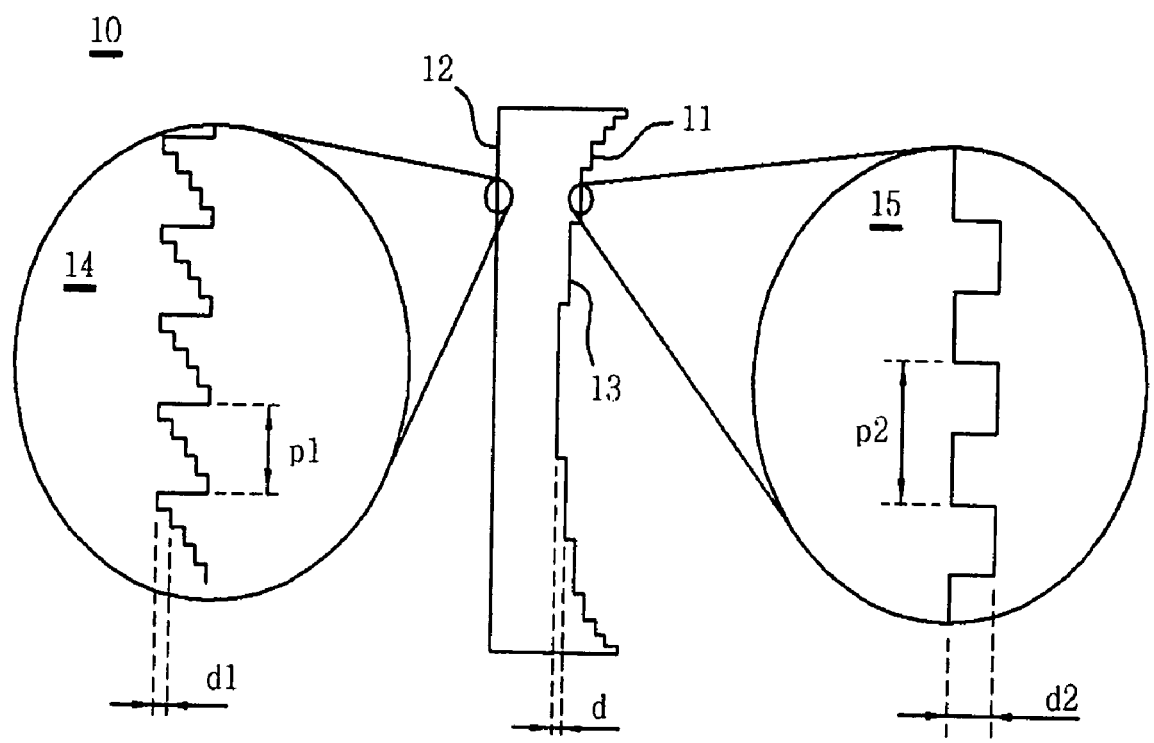
FIG. 8 is a schematic view showing a chromatic aberration-correcting element which has diffractive planes formed on sides, with which DVDs/CDs can be used compatibly.

Additionally, the chromatic aberration-correcting element 10 may further comprise a diffractive structure for allowing the compatible adoption of DVD/CDs. The chromatic aberration-correcting element 10 provided with the diffractive structure is shown in FIG. 8.

According to another embodiment of the present invention, the step structure 11 of the chromatic aberration-correcting element 10 has a CD-compatible diffractive plane 15 formed on upper sides of the steps, which is designed to diffract a CD wavelength ($\lambda_2=785$ nm) but not to diffract BD/DVD wavelengths so as to allow the compatible adoption of CDs. The chromatic aberration-correcting element 10 has a DVD-compatible diffractive plane 14 formed on the side 12 opposite to the step structure, which is designed to diffract a DVD wavelength ($\lambda_1=655$ nm) but not to diffract BD/CD wavelengths so as to allow the compatible adoption of DVDs.

As for the CD-compatible diffractive plane 15, it has a stepped structure with a step depth $d_2$ meeting the following formula:

$$d_2=m_2\lambda_o/(n_o-1) \text{ where } m_2 \text{ is an integer.} \qquad \text{Equation 4}$$

In the case of the DVD-compatible diffractive plane 14, its form is similar to a five-step brazing structure, with a step depth $d_1$ for each step designed to satisfy the following formula:

$$d_1=m_1\lambda_o/(n_o-1) \text{ where } m_1 \text{ is an integer.} \qquad \text{Equation 5}$$

The chromatic aberration-correcting element provided with the diffractive structure designed to satisfy Equations 4 and 5 diffracts almost none of the BD wavelength $\lambda_o$ so that $0^{th}$-order beams are composed mainly of the BD wavelength (90% or higher) while the beams incident on DVD/CDs are composed mainly of $1^{st}$-order diffraction beams.

Figure 9A:
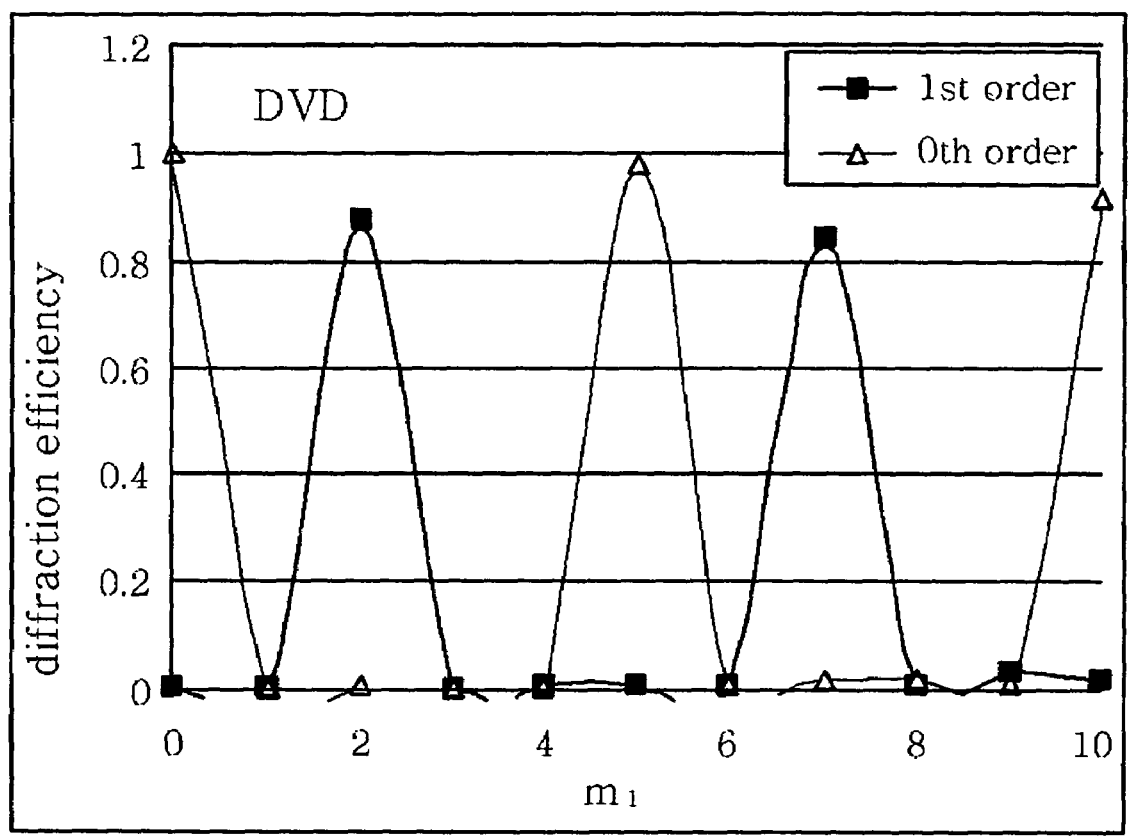
FIGS. 9A, 9B, 9C, and 9D show diffraction efficiencies of light beams at the diffractive planes
Figure 9B:
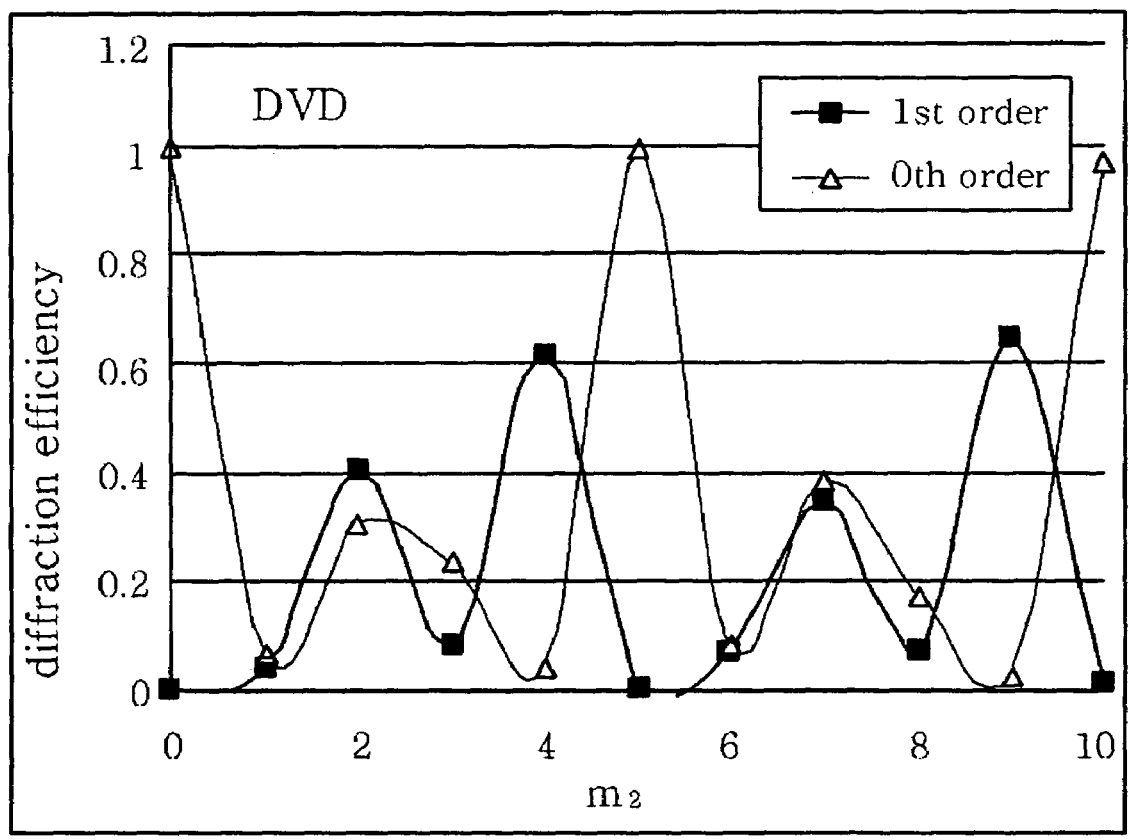
Figure 9C:
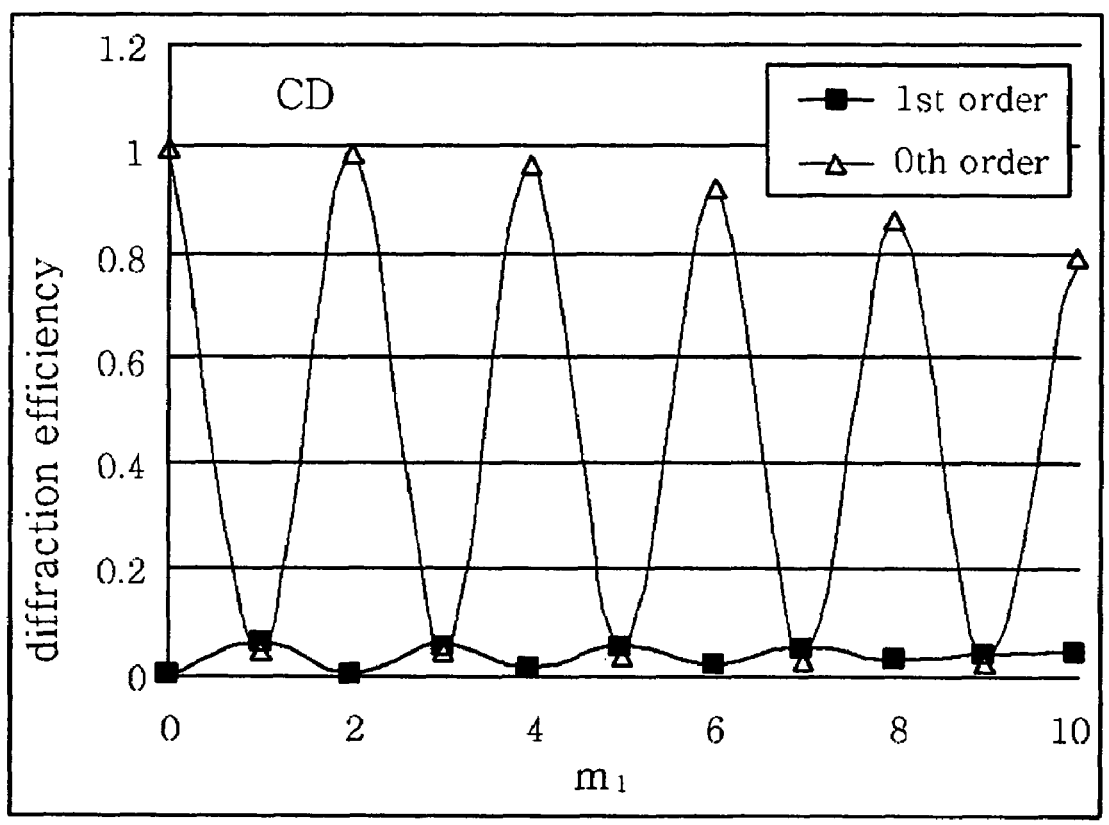
Figure 9D:
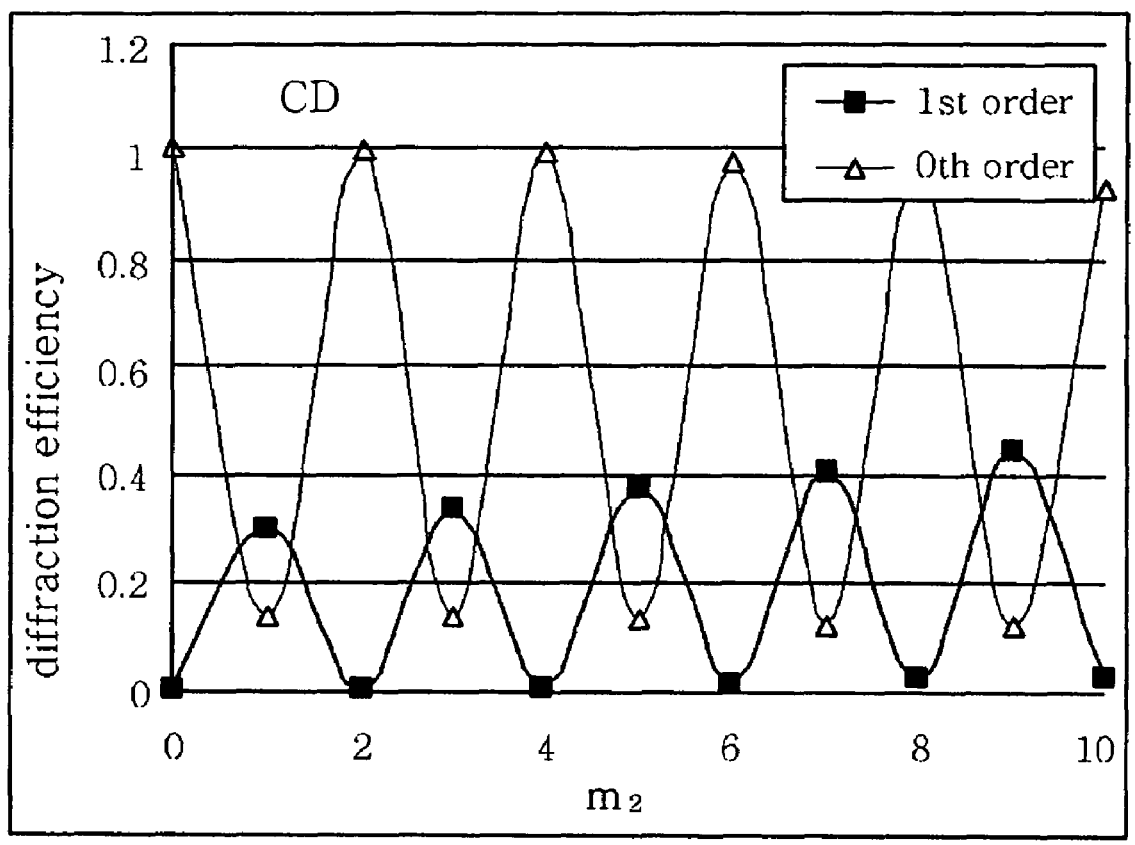

The diffraction efficiencies of the $1^{st}$-order diffraction beams for DVDs/CDs in the diffractive structure of the chromatic aberration-correcting element made from ZEONEX 330R are plotted versus $m_1$ and $m_2$ in FIGS. 9A-9D. Plots of FIGS. 9A and 9B are for diffraction efficiencies of the DVD-compatible diffractive plane while FIGS. 9C and 9D show diffraction efficiencies of the CD-compatible diffractive plane.

Where $m_1=2$, that is, $d_1=1.54$ um, the diffraction efficiency amounts to 84% for a DVD wavelength and is almost zero for a CD wavelength, as seen in the plots. At $m_2=5$, that is, at $d_2=3.85$ um, the diffraction efficiency is almost zero for a DVD wavelength and 40% for a CD wavelength. A DVD-compatible diffractive plane for exclusively diffracting DVD wavelengths ($\lambda_1$) and a CD-compatible diffractive plane for exclusively diffracting CD wavelengths ($\lambda_2$) can be accomplished by selecting the depths $d_1$ and $d_2$ with reference to such calculations. Although a diffraction efficiency of 40% for CDs is low relative to the DVD case, it is not a particular problem in the reproduction of data. As for the recording of data, it is possible with the aid of a high power laser diode (LD).

Figure 10A:
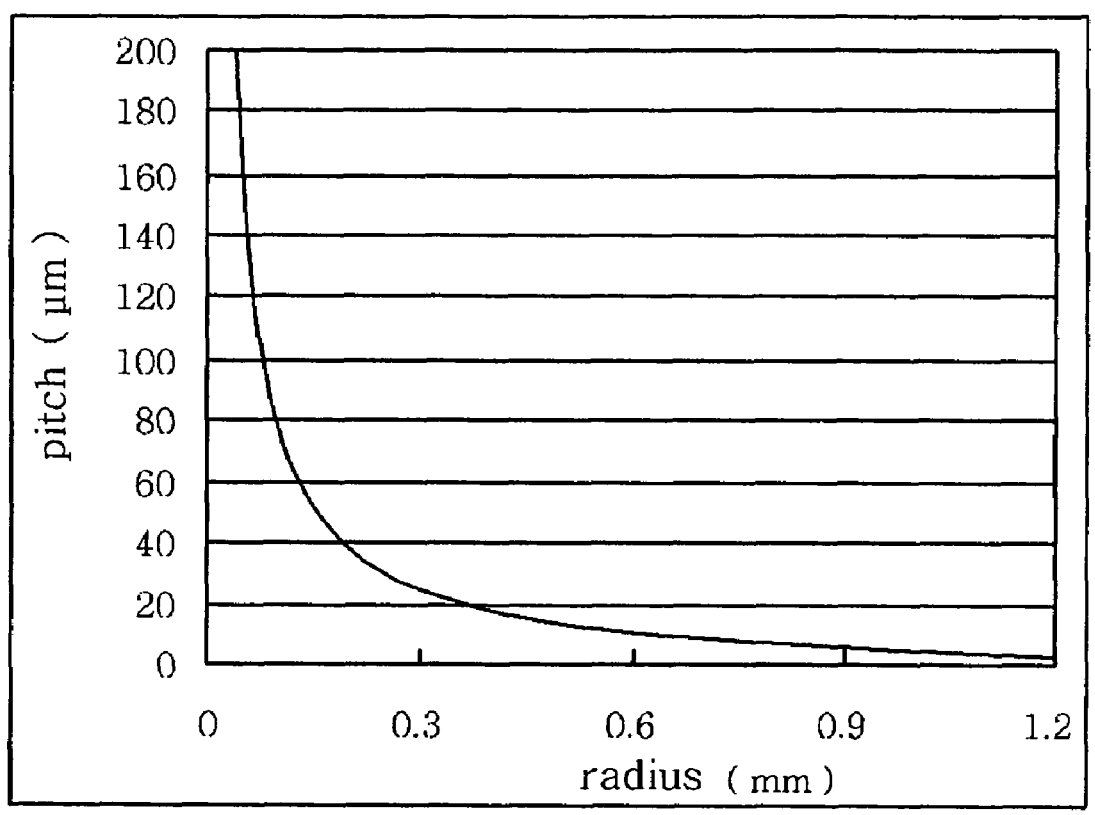
FIGS. 10A and 10B show plots of pitches of the diffractive planes versus radius.
Figure 10B:
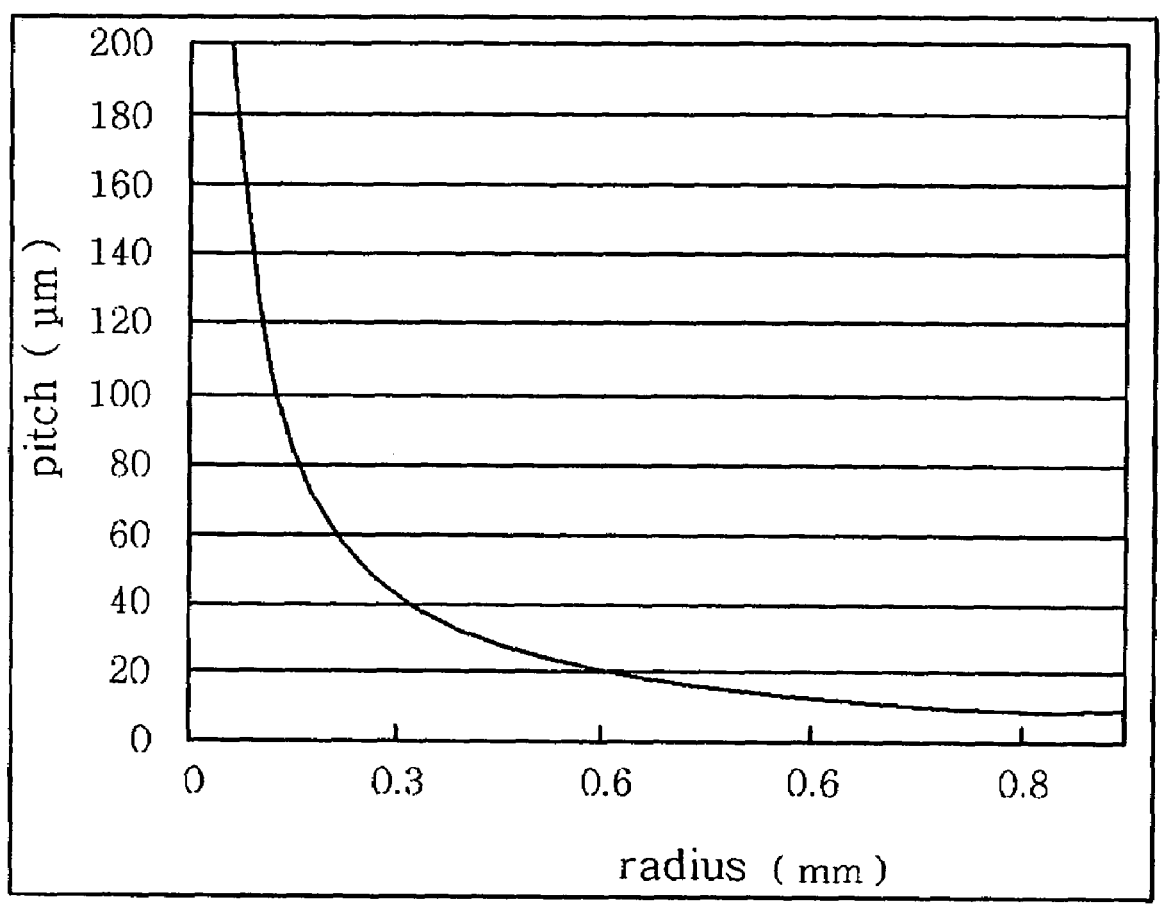

In the chromatic aberration-correcting element 10 provided with a diffractive structure having a DVD- and a CD-compatible diffractive plane optimized, the relation between the pitch p and the radius r of the diffractive structure is determined as shown in FIGS. 10A-10B. A plot of pitch versus radius on the DVD-compatible diffractive plane is drawn in FIG. 10A and a plot on the CD-compatible diffractive plane in FIG. 10B. An optical element provided with the diffractive structure having such a pitch and depths $d_1$ and $d_2$ may be additionally inserted into optical paths of the beams separately from the chromatic aberration-correcting element so as to allow the compatible adoption of DVD/CDs. However, the diffractive structure is preferably integrated into the chromatic aberration-correcting element, thereby simplifying the structure of the optical pickup device thus obtained. Furthermore, the simple structure can enable the optical pickup device to be produced at low cost and in a small size.

Figure 11:
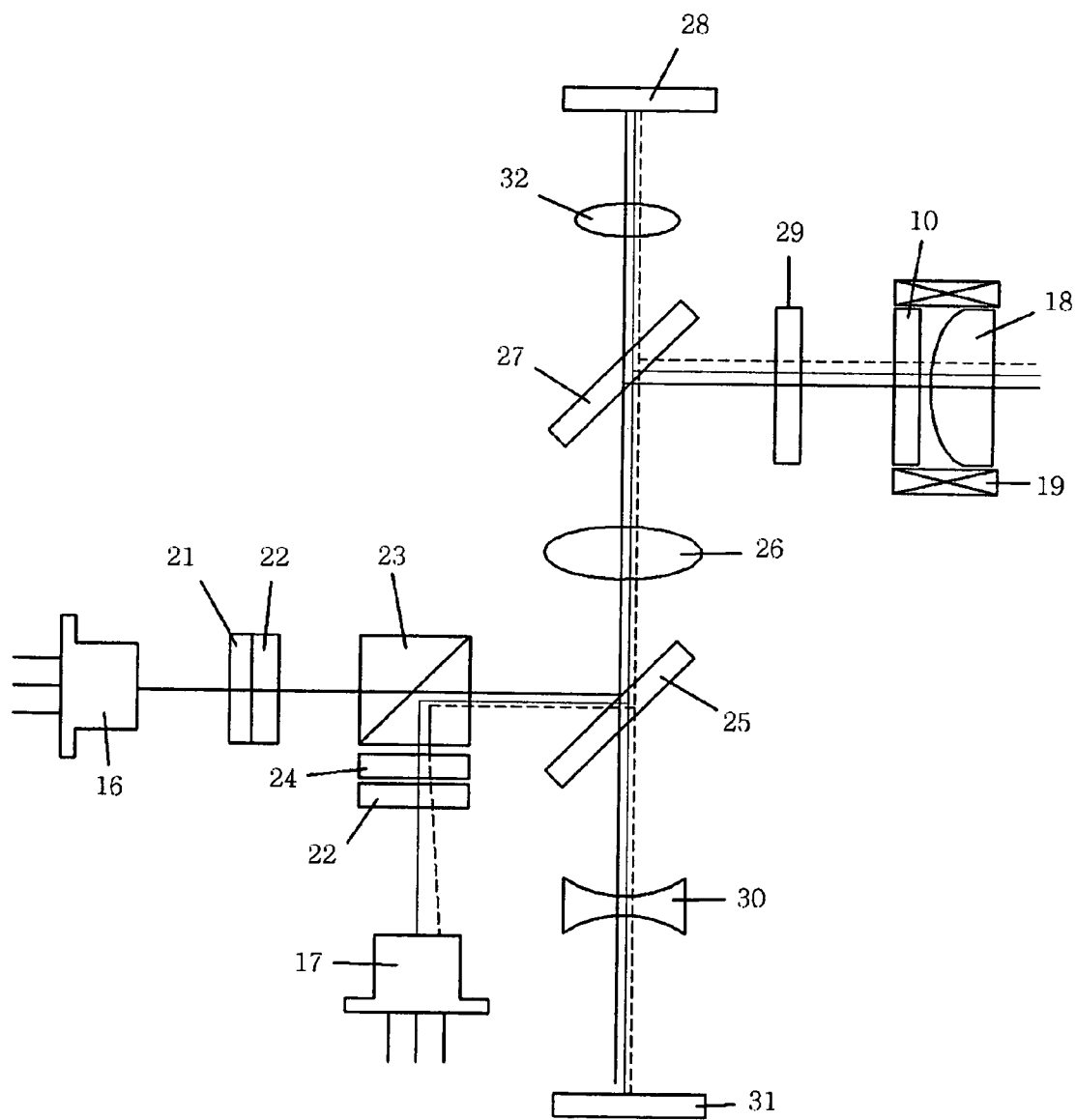
FIG. 11 is a view showing a structure of an optical pickup device employing the chromatic aberration-correcting element of the present invention.

With reference to FIG. 11, a simple structure of an optical pickup device comprising the chromatic aberration-correcting element 10 of the present invention is illustrated. The optical pickup device can universally adopt BDs, DVDs and CDs.

Because they are unable to position a chromatic aberration element for BDs in the optical path of DVD/CD wavelengths, conventional optical pickup devices have to be separately equipped with a BD photodetector and a DVD/CD photodetector. Of course, optical elements for each photodetector are additionally needed, as well, making the optical system very complicated.

By contrast, a chromatic aberration-correcting element for BD wavelengths can be positioned in the optical path of DVD/CD wavelengths without negative effects on universal adoption in accordance with the present invention. Therefore, the optical path can be common to all wavelengths. Moreover, all wavelengths can share not only a photodetector but also optical elements. In consequence, the optical system of the present invention can be simplified.

A detailed description will be given of the structure of the optical pickup device provided with the chromatic aberration-correcting element 10 of the present invention, with reference to FIG. 11. First, elements used in general optical pickup devices are illustrated.

In FIG. 11, numeral 16 is a laser diode for blue discs (wavelength 405 nm), referred to as "BD LD";

numeral 17 is a two-wavelength laser diode emitting a DVD wavelength (655 nm) beam and a CD wavelength (785 nm) beam, referred to as "TWIN LD";

numeral 21 is a half wave plate for rotating the polarization state of plane polarized light, referred to as "HWP";

numeral 22 is a grating forming a sub-spot on a disc to detect tracking error signals, referred to as "GT";

numeral 24 is a holographic optical element for joining optic axes of DVDs and CDs, referred to as "HOE";

numeral 23 is a dichroic beam splitter for combining DVD and CD beams with BD beams, referred to as "Dichroic BS";

numeral 25 is a polarized beam splitter for reflecting light into or transmitting light from discs, referred to as "PBS";

numeral 26 is a collimate lens for forming parallel beams, referred to as "CL";

numeral 27 is a leakage mirror with a reflectance of 90% and a transmittance of 10%, for use in detecting beam power with a front monitor photo detector;

numeral 28 is a front monitor photo detector for controlling the strength of the light incident on discs, referred to as "FPD";

numeral 29 is an element in which a liquid crystal element, referred to as "LCE", for correcting the spherical aberration due to disc thickness variation or due to double-layer discs is combined with a quarter wave plate, referred to as "QWP", for turning plane-polarized light into circularly polarized light and vice versa;

numeral 30 is a sensor lens for detecting focus error signals, referred to as "SL"; and numeral 31 is a photo detector with an integrated circuit for detecting read signals and focus/tracking error signals.

The optical pickup device provided with the chromatic aberration-correcting element of the present invention is operated as follows.

As a light source for recording or reproducing data, the BD LD 16 is utilized. The light beams emitted from the BD LD 16 pass through the HWP 21, the GT 22 and the dichroic BS 23 and then are reflected at the PBS 25 toward the CL 26 at which they are converted into parallel beams. The HWP 21 rotates the polarization state of incident beams such that almost all of the beams are reflected at the PBS 25, but may not be installed corresponding to the position of the BD LD 16. Also, the GT 22 is required to form sub-spots on a disc and conduct tracking motion according to a differential push-pull method. The dichroic BS 23 functions to transmit approximately 90% of wavelengths of around 408 nm, reflect approximately 90% of wavelengths of around 655 nm and 785 nm, and synthesize light beams suitable for recording on and reproducing from BDs and DVD/CDs.

A part (about 10%) of the parallel beams passing through the CL 26 are transmitted through the leakage mirror 27 and then condensed through a condensing lens 32 to the FPD 28. By monitoring the signals condensed to the FPD 28, the emission strength of the BD LD 16 is controlled, so as to stably record or reproduce data.

In the meantime, the beams reflected by the leakage mirror 27 pass through the element 29 in which the LCE and the QWP are combined together and then through the chromatic aberration-correcting element 10 of the present invention and focused through an objective lens 18 on a blue laser disc. The LCE serves to correct spherical aberrations due to the thickness variation in a disc cover layer or due to double layer discs. In the QWP, the change of linearly polarized light into yen polarized light occurs. The chromatic aberration-correcting element 10 correct the wavelength fluctuation due to the mode hop between reproduction and recording.

After being converted into linearly polarized beams perpendicular to the incident beams by the QWP, the light beams reflected from the disc pass through the PBS 25 and the SL 30 and then are condensed into the PDIC 31. The SL 30 is formed in a cylindrical form to detect focus error signals according to an astigmatic method. The PDIC 31 detects reproducing signals and error signals for controlling focus/tracking motion while an actuator is controlled according to control signals which are returned to an actuator driving circuit 19 in a feedback pattern so as to stably record or reproduce data.

For recording on or reproducing from DVDs, light beams with a wavelength of 655 nm emitted from the TWIN LD 17 data are utilized. The light beams emitted from the TWIN LD 17, after passing through the GT 22 and the HOE 24, are reflected at the dichroic BS 23 and then at the PBS 25 toward the CL 26 at which they are converted into parallel beams. Because the HOE 24 is designed so as not to operate in response to DVD wavelengths, it has no influence on the light transmitted therethrough. The GT 22 is required to form sub-spots on a disc to conduct a tracking motion according to a differential push-pull method.

A part (about 10%) of the parallel beams which pass through the CL 26 are transmitted through the leakage mirror 27 and then condensed through a condensing lens 32 to the FPD 28. By monitoring the signals from the FPD 28, the emission strength of the TWIN LD 17 is controlled, so as to stably record or reproduce data.

In the meantime, the beams reflected by the leakage mirror 27 pass through the element 29 in which the LCE and the QWP are combined with each other and then through the chromatic aberration-correcting element 10 of the present invention and focused through an objective lens 18 on a DVD. The operation of the LCE is not required because DVD light beams need not be corrected by the LCE. The QWP serves to change linearly polarized light into yen polarized light. After being incident on the chromatic aberration-correcting element 10, the parallel beams are changed into divergent beams capable of recording and reproducing data, by the diffractive structure.

Light beams reflected from the disc, after being converted into linearly polarized beams perpendicular to the incident beams by the QWP, pass through the PBS 25 and the SL 30 and then are condensed into the PDIC 31. The SL 30 has such a cylindrical form as to detect focus error signals according to an astigmatic method. The PDIC 31 detects reproducing signals and error signals for controlling focus/tracking motion while an actuator is controlled according to control signals which are returned to an actuator driving circuit 19 in a feedback pattern so as to stably record or reproduce data.

As in DVDs, recording on or reproducing from CDs uses the TWIN LD 17 as a light source, but only 785 nm beams among those emitted from TWIN LD 17 are applicable therefor. The CD beams from the TWIN LD 17 pass through the GT 22 and the HOE 24, followed by reflection at the dichroic BS 23 and then at the PBS 25 to direct the beams toward the CL 26. At the CL 26, the reflected beams are converted into parallel beams. Because the HOE 24 is so designed as to diffract CD wavelengths, it changes the angle of the light beams transmitted therethrough so that the parallel beams are directed at the same angle as in the DVD wavelengths. The GT 22 is required to form sub-spots on a disc to conduct a tracking motion according to a three-spot method.

A part (about 10%) of the parallel beams which pass through the CL 26 are transmitted through the leakage mirror 27 and then condensed through a condensing lens 32 to the FPD 28. By monitoring the signals from the FPD 28, the emission strength of the TWIN LD 17 is controlled, so as to stably record or reproduce data.

In the meantime, the beams reflected by the leakage mirror 27 pass through the optical element 29 in which the LCE and the QWP are combined with each other and then through the chromatic aberration-correcting element 10 of the present invention, and focused on a CD by the objective lens 18. The operation of the LCE is not required because CD light beams need not be corrected by the LCE. The linearly polarized light is changed into yen polarized light by the QWP. After being incident on the chromatic aberration-correcting element 10, the parallel beams are changed into divergent beams capable of recording and reproducing data, by the diffractive structure.

Light beams reflected from the disc, after being converted into linearly polarized beams perpendicular to the incident beams by the QWP, pass through the PBS 25 and the SL 30 and then are condensed into the PDIC 31. The SL 30 has such a cylindrical form as to detect focus error signals according to an astigmatic method. The PDIC 31 detects reproducing signals and error signals for controlling focus/tracking motion while an actuator is controlled according to control signals which are returned to an actuator driving circuit 19 in a feedback pattern so as to stably record or reproduce data.

A feature of the present invention, as described hereinbefore, is that the chromatic aberration-correcting element of the present invention enables a photo detector to be commonly used for BD, DVD and CD wavelengths, thereby simplifying the structure of the optical pickup device provided therewith. In addition, not only does the diffractive structure of the chromatic aberration-correcting element of the chromatic aberration-correcting element DVD allows the universal adoption of CDs and DVDs, but also the stepped structure of the chromatic aberration-correcting element enables a single objective lens to be applicable to BD, DVD and CD wavelengths. Thus, many optical elements can be used in common for BD, DVD and CD wavelengths, so that the optical pickup device provided with the chromatic aberration-correcting, element has a simple structure with superior operational efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A chromatic aberration-correcting optical element comprising:
   a stepped structure having a concentric pattern on at least one side, wherein the stepped structure further comprises a step depth d, wherein d is defined by the formulas:

$$d = m_o \times \lambda_o/(n_o-1); \quad d(n_1-1)/\lambda_1 = m_1+\alpha; \text{ and } d(n_2-1)/\lambda_2 = m_2+\beta$$

where $m_o$ is an integer, $\lambda_o$ is a wavelength for a high-density recording medium, and $n_o$ is a refractive index of a diffractive optical element at the wavelength $\lambda_o$; $m_1$ is an integer, $\lambda_1$ is a wavelength for a first low-density recording medium, $n_1$ is a refractive index for a diffractive optical element, and $-0.1 < \alpha < 0.1$; $m_2$ is an integer, $\lambda_2$ is a wavelength for a second low-density recording medium, and $-0.1 < \beta < 0.1$, and the first low-density recording medium has a higher recording density than the second low density recording medium,
   wherein a phase difference is generated between two adjacent steps of the stepped structure represented by $d(n_0-1)/(\lambda_o+\Delta\lambda)$, when a light beam with a wavelength of $(\lambda_o+\Delta\lambda)$ is incident on the chromatic aberration-correcting element,
   wherein $$d(n_0-1)/(\lambda_o+\Delta\lambda) \approx \{d(n_o-1)/\lambda_o\}(1-\Delta\lambda/\lambda_o) = m_o(1-\Delta\lambda/\lambda_o) \quad (\lambda_o >> \Delta\lambda), \text{ and}$$

wherein steps of the concentric pattern increases by one order with regard to a radius r of the chromatic aberration-correcting element when a waterfront aberration increases by $-m_o(1-\Delta\lambda/\lambda_o)$.

2. The chromatic aberration-correcting element as set forth in claim 1, wherein the phase difference is substantially $-m_o(\Delta\lambda/\lambda_o)$, and the concentric pattern is structured such that the steps of the stepped structure increase by one order with regard to the radius r of the chromatic aberration-correcting element when the waterfront aberration increases by $m_o(\Delta\lambda/\lambda_o)$.

3. The chromatic aberration-correcting element as set forth in claim 1, further comprising a diffractive structure provided on at least one side, wherein the diffractive structure allows the compatible adoption of the light wavelength $\lambda_1$ for the first low-density recording medium and the light wavelength $\lambda_2$ for the second low-density recording medium.

4. The chromatic aberration-correcting element as set forth in claim 3, wherein the diffractive structure is formed on the stepped structure of the concentric pattern, and uses a wavelength of a light beam for the second low-density recording medium.

5. The chromatic aberration-correcting element as set forth in claim 3, wherein, the diffractive structure is a diffractive stepped structure, comprising:
   a step depth $d_1$ for the first low-density recording medium, wherein $d_1$ is defined by the formula:

$$d_1 = m_1 \times \lambda_o/(n_o-1)$$

where $m_1$ is an integer, $\lambda_o$ is a wavelength for the high-density recording medium, and $n_o$ is a refractive index of the diffractive optical element at $\lambda_o$; and
   a step depth $d_2$ for the second low-density recording medium, wherein $d_2$ is defined by the formula:

$$d_2 = m_2 \times \lambda_o/(n_o-1)$$

where $m_2$ is an integer, $\lambda_o$ is a wavelength for the high-density recording medium, and $n_o$ is a refractive index of the diffractive optical element at $\lambda_o$.

6. The chromatic aberration-correcting element as set forth in claim 3, wherein light beams for the high-density recording medium are $0^{th}$-order beams and the low-density recording medium are $1^{st}$-order beams, after diffraction by the chromatic aberration-correcting element.

7. The chromatic aberration-correcting element as set forth in claim 3, wherein the diffractive structure is formed as on the stepped structure of the concentric pattern.

8. The chromatic aberration-correcting element as set forth in claim 1, wherein light beams for the high-density recording medium are $0^{th}$-order beams and the low-density recording medium are $1^{st}$-order beams, after diffraction by the chromatic aberration-correcting element.

9. An optical pickup device, comprising:
   a chromatic aberration-correcting element of claim 1; and
   a photodetector for detecting light beams reflected from the high-density recording medium and the low-density recording medium, wherein the light beams reflected from the high-density recording medium takes the path of incident light beams as a result of diffraction by the chromatic aberration-correcting element.

10. An optical pickup device, comprising:
    a chromatic aberration-correcting element of claim 2; and
    a photodetector for detecting light beams reflected from the high-density recording medium and the low-density recording medium, wherein the light beams reflected from the high-density recording medium takes the path of incident light beams as a result of diffraction by the chromatic aberration-correcting element.

11. An optical pickup device, comprising:
    a chromatic aberration-correcting element of claim 3; and
    a photodetector for detecting light beams reflected from the high-density recording medium and the low-density recording medium, wherein the light beams reflected from the high-density recording medium takes the path of incident light beams as a result of diffraction by the chromatic aberration-correcting element.

12. An optical pickup device, comprising:
    a chromatic aberration-correcting element of claim 4; and a photodetector for detecting light beams reflected from the high-density recording medium and the low-density recording medium, wherein the light beams reflected from the high-density recording medium takes the path of incident light beams as a result of diffraction by the chromatic aberration-correcting element.

13. An optical pickup device, comprising:
a chromatic aberration-correcting element of claim 5; and
a photodetector for detecting light beams reflected from the high-density recording medium and the low-density recording medium, wherein the light beams reflected from the high-density recording medium takes the path of incident light beams as a result of diffraction by the chromatic aberration-correcting element.

* * * * *